Feb. 12, 1963     O. W. UFERT     3,077,146
METHOD OF MAKING WORM WHEELS
Original Filed March 21, 1955     2 Sheets-Sheet 2
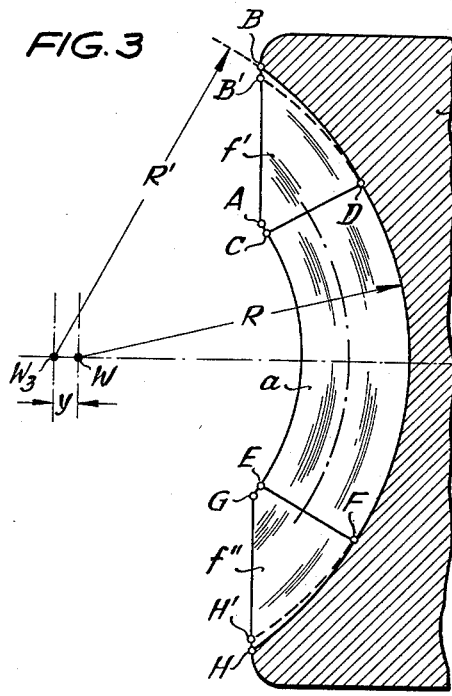
FIG. 3
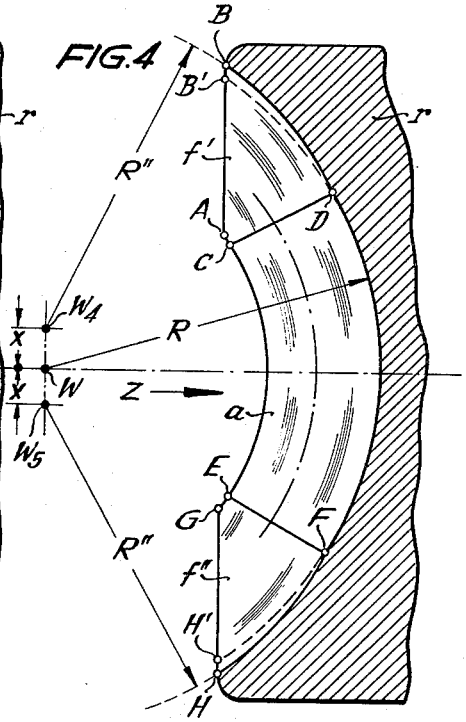
FIG. 4
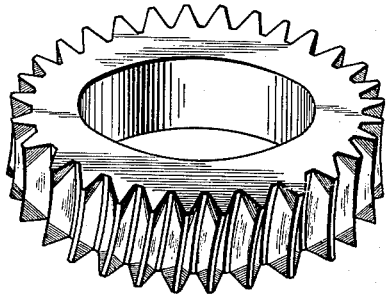
FIG. 5
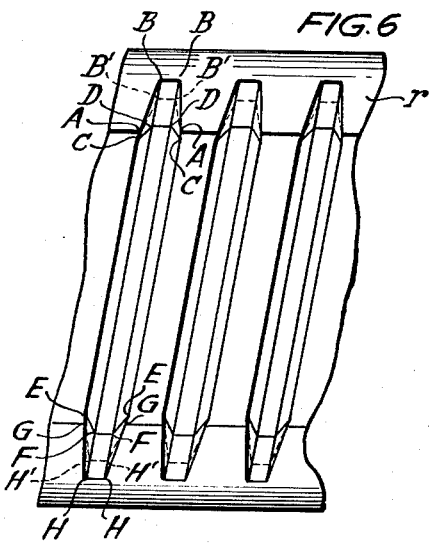
FIG. 6
INVENTOR
OTTO W. UFERT
By
Patent Agent United States Patent Office 3,077,146
Patented Feb. 12, 1963

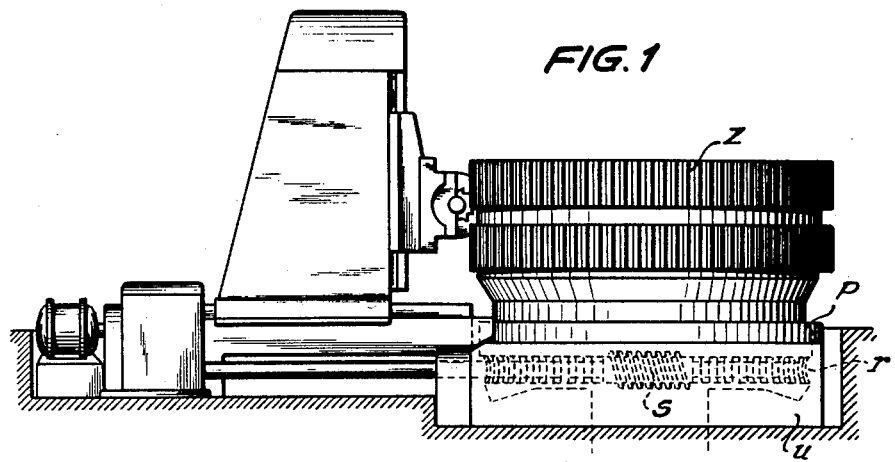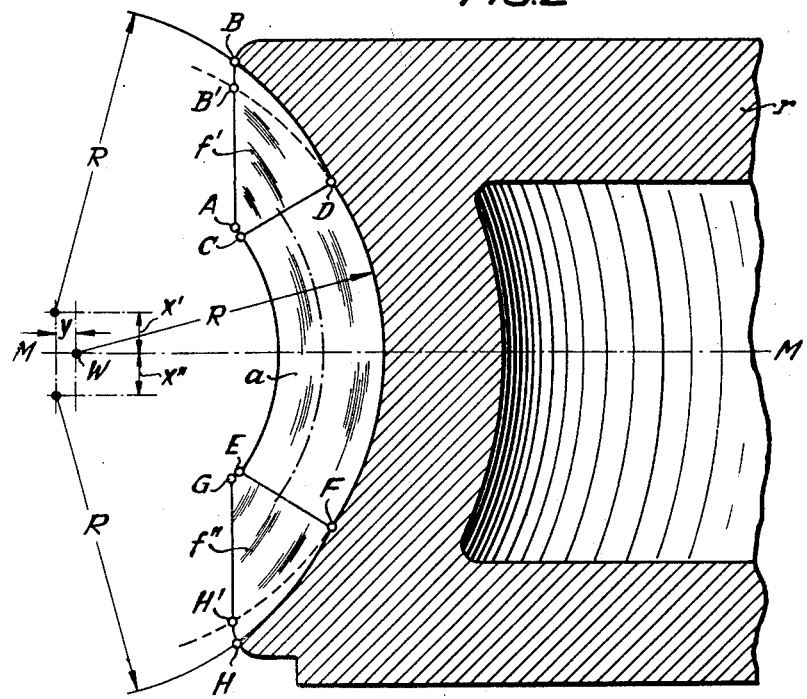

3,077,146
METHOD OF MAKING WORM WHEELS
Otto W. Ufert, Dusseldorf-Oberkassel, Germany, assignor to Schiess Aktiengesellschaft, Dusseldorf-Oberkassel, Germany
Original application Mar. 21, 1955, Ser. No. 495,563, now Patent No. 2,821,865, dated Feb. 4, 1958. Divided and this application Jan. 24, 1957, Ser. No. 636,049
Claims priority, application Germany Mar. 30, 1954
1 Claim. (Cl. 90—4)

The present invention relates to a method of making a worm wheel, especially a dividing worm wheel for gear cutting machines and is a divisional application of my co-pending application Ser. No. 495,563 filed March 21, 1955 which has matured into Patent No. 2,821,865 issued February 4, 1958.

With high grade worm wheel drives, the formation of an oil film between the flanks of the worm and the flanks of a worm wheel contacted thereby is all the more important the higher the load will be which acts on the teeth or the higher the speed will be at which the worm and worm wheel slide upon each other.

In view of the fact that a good surface luburication is of greatest importance for the working of a worm wheel drive, numerous suggestions have been made and tried out to facilitate the formation of an oil film between the flanks of the worm and of the worm wheel. Thus, for instance, attempts have been made to create favorable conditions for the formation of an oil film by profiling the worm in a manner which appeared to be appropriate, especially by shaping the working surfaces in a certain manner. A change in the profile shape may indeed favorably affect the function of the drive.

The formation of an oil film, however, does not solely depend on the shape of the working flanks but also depends on the conditions under which the engagement between the worm and the worm wheel starts. With the known worm wheel drives, these conditions are generally very unfavorable because right at the start of the engagement between worm and worm wheel, the lubricating oil is stripped off at the edges of the teeth. In order to avoid this drawback, it has been suggested to remove the burrs of the tooth edges or to round off said edges. This step, however, is not sufficient to obtain a noticeable improved oil film formation.

It is, therefore, an object of the present invention to provide a method of making a worm wheel which will overcome the above mentioned drawbacks.

It is another object of this invention to provide a method of making a worm wheel by means of which the stripping off of the oil film at the beginning of the engagement of worm and worm wheel will be avoided.

It is still another object of this invention to provide a method of making a worm wheel which prior to the start of engagement between worm wheel and worm will allow the formation of a wedge-shaped oil film of sufficient length on the worm wheel in order to prevent the stripping off of the oil and to promote the formation of an oil film between the worm wheel and the worm.

These and other objects and advantages of the invention will appear more clearly from the following specification in connection with the accompanying drawings, in which:

FIG. 1 is a diagrammatic side view of a gear cutting machine with a dividing worm wheel.

FIG. 2 is a cross section through the worm wheel according to FIG. 1 with teeth shaped in conformity with the method of the present invention, the section shown in FIG. 2 being considerably enlarged over the illustration shown in FIG. 1.

FIG. 3 is a partial section through a worm wheel made in conformity with the method according to the invention and illustrates the production of a worm wheel according to the invention in conformity with a method differing from the method employed in connection with the manufacture of the worm wheel of FIG. 2.

FIG. 4 is a partial section through a worm wheel made according to still another method of the invention.

FIG. 5 is a perspective illustration of a worm wheel made according to the invention.

FIG. 6 illustrates in development a partial view of the worm wheel of FIG. 5 as seen in the direction of the arrow Z of FIG. 4.

General Arrangement

According to the present invention, the flanks of the worm wheel are provided with working portions, while at both sides of said working portions there are provided portions which will promote the formation of a wedge-shaped oil film. The flank portions are associated with worms, the axes of which are offset with regard to each other. The axes of the worms associated with said flank portions may be offset radially or laterally with regard to the worm wheel. The flanks of a worm wheel of this type may, in conformity with the invention, be cut in three steps. To this end, for instance, the working flank portions may be first be cut in customary manner, whereupon subsequently the tooth flanks at one face of the wheel are cut by means of a tool which is offset toward said face, if desired, in radial direction from the work piece. Finally, the tooth flanks on the other face of the wheel are cut by means of a tool offset toward said last-mentioned face and, if desired, moved away from the work piece in radial direction.

It is also possible in conformity with the invention to produce the worm wheel flanks by two working steps. To this end, first the working flank portion is cut in a customary manner by means of a tool of the pitch diameter of the worm. Subsequently, the lateral portions of the tooth flanks are cut by means of a tool which is removed from the work piece in radial direction and has a diameter greater than that of said first-mentioned tool.

The working operations are preferably carried out on one and the same machine, the tool axis only being adjusted accordingly. If the working operations are carried out in three steps, all three working steps may be carried out by means of one and the same tool.

Structural Arrangement

Referring now to the drawings in detail, FIG. 1 shows a gear cutting machine for cutting teeth into a heavy work piece Z which is carried by a face plate p, forming the work piece table. The face plate p is rotatably journalled on a bed. The rotation of the face plate p is brought about by a dividing worm wheel drive, including a dividing worm wheel r fastened to the face plate p, and also including a dividing worm s. In contrast to the heretofore customary shape and design of teeth for worm wheels according to which the entire tooth flank engages the worm, worm wheels designed in conformity with the invention have in addition to the normally shaped working tooth flank portions $a$ (FIG. 2) defined by the corner points C—D—F—E, laterally of said working tooth flank portions $a$ also free-cut or relieved flank side portions $f'$, $f''$ defined by the lines A—B—D—C and E—F—H—G. These flank side portions $f'$, $f''$ may be produced in various manner.

According to FIG. 2, said portions $f'$, $f''$ are produced by hobbing means of the same hob by means of which the working flank portions $a$ are cut. To this end, the axis of the cutter which, for producing the working flank portions $a$, occupies the working position W is moved into the positions $W_1$ and $W_2$. In these positions, the axis of the tool is over the position occupied during the cutting of the flank center portions $a$ offset by small distances $X'$, $X''$ and Y toward the two faces of the wheel or in radial direction away from the wheel center point. The cut free surfaces $f'$, $f''$ themselves thus form portions of teeth flanks of a worm wheel. When free cutting the flank portions $f'$, $f''$ by means of a cutter having a diameter R and by offsetting the axes by $X'$ or $X''$ and Y, also the tooth base is free-cut in conformity with the shape of a comma as is indicated by the points B—B'—D and H—H'—F. By axially adjusting the hob in such a manner that the cutter teeth can simultaneously work on the front and backside of the tooth flanks, the advantage is obtained that by means of a single cut, the total work of the free cutting of one side of the worm wheel at the front and rear tooth flanks and at the base of the tooth can be carried out.

As shown in FIG. 3, the free surfaces $f'$, $f''$ can also be created if, following the cutting of the cutting flank portions $a$ by means of a cutter of the radius R, the axis of which is designated with the reference W, a larger tool of the radius R' is moved away from the work piece by a distance Y and has its axis moved into the position $W_3$. This method is particularly expedient when cutting by means of an impact tooth. It is self-understood that also in this instance, the greater tool has to be so adjusted that it will attack uniformly at all points to be cut free.

Instead of a greater work tool or a work tool of the same size, also a smaller work tool may be employed for producing the free cut surfaces $f'$, $f''$. This is clearly illustrated in FIG. 4 according to which following the creation of the working surfaces $a$ by means of a tool of a radius R, the axis of the tool is only laterally moved toward the faces of the work piece by a distance X. In other words, the axis of the tool is moved out of the position W into the positions $W_4$ or $W_5$. In these positions, another work tool is employed which has a radius R'' smaller than the radius R of the first employed tool.

The employment of a worm wheel made according to the invention in a worm wheel drive thus brings about the formation of a longitudinally extending wedge-shaped oil film with a small wedge angle outside the range of engagement of said worm wheel with the respective worm. Thus, at the very start of the engagement between worm and worm wheel, wedge-shaped lubricant cushions are present which make impossible the tearing off of the oil film and will assure that also within the range of engagement between worm and worm wheel, said oil film will not vanish. In addition thereto, the advantage is obtained that the teeth due to the increase of their lateral grip are more bend-resistant than the teeth of a worm wheel having uniform working surfaces. This is of particular importance in connection with worm wheels which in view of special working conditions of the drive embrace the worm over a wide angle as is the case, for instance, with dividing worm wheels of large gear cutting machines which have a relatively fine toothine and are provided with a considerable number of teeth, so that at the last position before the work piece, once more a great transmission ratio can be obtained. These dividing worm wheels have to move with greatest uniformity not only the work piece table which with large gear cutting machines weighs many tons, but also the work piece which is frequently still heavier and not seldom has a weight from fifty to seventy tons. In spite of these great loads, the elastic deformations of the teeth must only be very small—less than 0.001 millimeter—because otherwise the work pieces cannot any longer be provided with precise teeth. In order to prevent the teeth from bending and in order laterally to support said teeth in a proper manner, the dividing worm wheels of gear cutting machines are frequently designed cylindrically. The cylindrical shape of dividing worm wheels, however, brings about that the range of engagement with the worm extends over a great sector angle of the dividing worms and thus has a form which is unfavorable for the formation of an oil film. The engagement also becomes very long and, consequently, the difference in the co-efficients of expansion of worm wheel and worm becomes all the more effective in a harmful manner the longer the range of engagement. In this connection, it should be noted that with gear cutting machines, the worm and worm wheel respectively consist of different material, and that during the operation of the drive, a considerable increase in temperature of said parts will occur.

The invention, on the other hand, makes possible the production of rigid worm wheel teeth adapted to resist high load without enlarging the range of engagement between the worm wheel and the worm. The working flanks can be limited to the central portion of the worm wheel profile.

The formation of a high oil pressure and thus the required oil film at the start of the engagement between worm wheel and worm is furthermore favored by the fact that that portion of the tooth bottom which delimits the flank side portions is tapered in a continuously increasing manner in the direction toward the faces of the wheel.

With the worm wheel according to the invention, the oil wedge angle remains substantially uniform over the entire height of the tooth.

Furthermore, the creation of the sections to be free cut is considerably simplified because the free cutting of the flank side portions and the tooth bottom can be effected on the same machine with the same tool, and while the work piece remains chucked in its respective position in which the cutting of the working flank portions of the teeth was effected. Special machine tools, special tools and additional operations caused by a resetting of the work piece and rechucking of the same are not required.

It is, of course, understood that the present invention is, by no means, limited to the particular methods described in connection with the drawings but also comprises any modifications within the scope of the appended claims.

Thus, also worm wheels which instead of a cylindrical blank shape are conically shaped can be provided with free cut surfaces in conformity with the present invention. Furthermore, instead of a hob for the free cutting, also an impact knife may be employed. The free cutting may be effected asymmetrically when the worm wheel is not symmetrically designed.

What I claim is:

A method of producing a worm wheel having the central tooth flank portions only provided as working sections, which includes the steps of: cutting the work piece to be formed into the worm wheel to form said working sections in customary manner by means of a first working tool having a diameter equaling the pitch diameter of the worm to engage said worm wheel; and cutting the tooth flanks adjacent each intended end of said working sections by means of a second working tool having a larger diameter than said first working tool but with the axis of rotation thereof spaced from the axis of rotation of said first working tool in radial direction of said work piece.

References Cited in the file of this patent

UNITED STATES PATENTS

| | | |
|---|---|---|
| 1,578,589 | Earl | Mar. 30, 1926 |
| 1,680,083 | Blades et al. | Aug. 7, 1928 |
| 2,108,244 | Wildhaber | Feb. 15, 1938 |
| 2,321,102 | Pelphrey | June 8, 1943 |
| 2,348,845 | Pelphrey | May 16, 1944 |
| 2,882,799 | Budnick | Apr. 21, 1959 |

FOREIGN PATENTS

| | | |
|---|---|---|
| 804,459 | France | Oct. 24, 1936 |
| 856,881 | Germany | Dec. 1, 1952 |
| 868,687 | Germany | Feb. 26, 1953 |